(12) United States Patent
Carr et al.

(10) Patent No.: US 6,405,141 B1
(45) Date of Patent: Jun. 11, 2002

(54) DYNAMIC TRACK STIFFNESS MEASUREMENT SYSTEM AND METHOD

(75) Inventors: Gary A. Carr, Fairfax; Cameron D. Stuart, Springfield, both of VA (US)

(73) Assignee: Ensco, Inc., Springfield, VA (US)

( * ) Notice: Subject to any disclaimer, the term of this patent is extended or adjusted under 35 U.S.C. 154(b) by 0 days.

(21) Appl. No.: 09/517,494

(22) Filed: Mar. 2, 2000

(51) Int. Cl.$^7$ ................................................. G01B 5/28
(52) U.S. Cl. ............................ 702/36; 702/158; 702/36
(58) Field of Search ........................... 73/146, 105, 779, 73/786, 800; 33/1, 174 P, 287, 523.2; 177/48, 201; 246/122 R; 250/231.1; 364/550; 369/59

(56) References Cited

U.S. PATENT DOCUMENTS

| | | | | |
|---|---|---|---|---|
| 3,750,299 A | * | 8/1973 | Plasser et al. ................. 33/287 |
| 3,896,665 A | * | 7/1975 | Goel ........................... 73/146 |
| 4,288,926 A | * | 9/1981 | Long et al. ................. 33/174 P |
| 4,290,499 A | * | 9/1981 | Luomaranta ................. 177/48 |
| 4,293,218 A | * | 10/1981 | Nielsen et al. ............... 356/138 |
| 4,560,016 A | | 12/1985 | Ibanez et al. |
| 4,577,494 A | * | 3/1986 | Jaeggi ........................ 73/105 |
| 4,691,565 A | * | 9/1987 | Theurer ....................... 73/146 |
| 4,701,866 A | * | 10/1987 | Harrison et al. ............ 364/550 |
| 5,151,891 A | * | 9/1992 | Bergmans ..................... 369/59 |
| 5,161,891 A | | 11/1992 | Austill |
| 5,301,548 A | * | 4/1994 | Theurer ........................ 73/146 |
| 5,330,136 A | * | 7/1994 | Colbaugh ............... 246/122 R |
| 5,353,512 A | * | 10/1994 | Theurer ..................... 33/523.2 |
| 5,365,059 A | * | 11/1994 | Savage .................... 250/231.1 |
| 5,461,924 A | * | 10/1995 | Calderara et al. ............. 73/786 |
| 5,462,224 A | * | 10/1995 | Van Der Hoek et al. ....................... 246/122 R |
| 5,462,244 A | | 10/1995 | Van Der Hock et al. |
| 5,654,511 A | * | 8/1997 | Sugino et al. ................. 73/779 |
| 5,668,324 A | * | 9/1997 | Voss et al. .................... 73/800 |
| 5,703,334 A | * | 12/1997 | Hansson et al. ............. 177/201 |
| 5,756,903 A | * | 5/1998 | Norby et al. .................. 73/786 |
| 6,119,353 A | * | 9/2000 | Gronskov ........................ 33/1 |

* cited by examiner

Primary Examiner—John S. Hilten
Assistant Examiner—Douglas N Washburn
(74) Attorney, Agent, or Firm—Nixon Peabody LLP; Jeffrey L. Costellia

(57) ABSTRACT

A method and apparatus for dynamically measuring a railroad track condition using a railroad truck with metal track engaging wheels as a reference platform from which a line of sight reference plane spaced from the track is created. Measurements are successively taken between the track and the reference plane as the railroad truck moves along the track.

34 Claims, 3 Drawing Sheets

DYNAMIC TRACK STIFFNESS MEASUREMENT SYSTEM AND METHOD

TECHNICAL FIELD

The present invention relates generally to the measurement of railroad track stiffness in the vertical plane and more particularly to a dynamic track stiffness measurement system and method for the repetitive measurement of railroad track position and deflection under load from a moving measurement vehicle.

BACKGROUND OF THE INVENTION

In the past, a variety of measuring devices have been developed to sense and measure various features of a railroad track. U.S. Pat. Nos. 5,654,511 to Sugino et al. and U.S. Pat. No. 5,756,903 to Norby et al. illustrate known static and dynamic track measuring devices and methods. However, one track feature, deflection under load in the vertical plane has proven difficult to measure accurately under any condition and particularly difficult to measure in a continuous, dynamic manner.

With the advent of high speed rail corridors, accurate measurements of track stiffness in the vertical plane along the length of the corridor are a key to building and maintaining reliable track condition and performance data for the corridor. Since both lightweight, highspeed trains and slower, heavy freight trains are likely to pass over the same tracks in the high speed corridor, the effect on the rails, the cross tie ballast and the subgrade layers varies with the traffic thereby making track degradation in the corridor a variable which must be monitored if proper track maintenance is to be achieved.

In vertical plane track stiffness measurement, it is critical that resolution be high. This requires a stable reference plane from which track position and vertical deflection can be determined as a function of track loading. In the past, static wayside measuring techniques have been used with the ground adjacent the track as a static reference relative to which track deflection under load in the vertical plane is measured by spaced transducers or other measuring devices positioned at selected locations. Using this technique, only limited sections of the track along a corridor are sensed, and a multiplicity of static transducers are required making this technique expensive. U.S. Pat. No. 4,701,866 to Harrison et al. discloses a static analog measuring system for measuring wheel loads at selected locations along a track.

SUMMARY OF THE INVENTION

It is a primary object of the present invention to provide a novel and improved method and apparatus for dynamically measuring a railroad track condition using a railroad reference platform to create a line of sight reference relative to which the position of the track is measured.

Another object of the present invention is to provide a novel and improved method and apparatus for dynamically measuring a track condition using a railroad reference platform from which a reference plane is created and taking a plurality of spaced, successive measurements of track position relative to the reference plane as the railroad reference platform moves along the track.

A further object of the present invention is to provide a novel and improved method and apparatus for dynamically measuring railroad track condition using a railroad reference truck from which a reference plane is created and a second track reference which measures the distance between the track and a target. This second track reference may be a second railroad truck spaced from the railroad reference truck. The second railroad truck carries a target, and the position where the reference plane contacts the target is used to obtain a track geometry and performance measurement.

Yet a further object of the present invention is to provide a novel and improved method and apparatus for dynamically measuring a railroad track condition using a railroad reference truck from which a reference plane is created and a second railroad truck spaced from the railroad reference truck. A first track condition measurement is made relative to the reference plane when the reference truck is over a point in the track and a second track measurement is made relative to the reference plane when the second railroad truck is over the same point in the track.

A further object of the present invention is to provide a novel and improved method and apparatus for dynamically measuring a railroad track condition using a first railroad reference truck from which a first reference plane is created, a second railroad truck spaced from the first railroad reference truck, a second railroad reference truck from which a second reference plane is created, and a third railroad truck spaced from said second railroad reference truck. A load is applied to said third reference truck, and a first track condition measurement is made relative to the first reference plane when said second railroad truck is over a point in the track. A second track condition measurement is made relative to the second reference plane when the third railroad truck is over the same point in the track.

These and other objects of the invention are achieved by creating a reference line or plane from a reference railroad truck that is the same or parallel to a plane extending through the center of the wheels of the reference railroad truck. The reference plane is created preferably by an optical beam source, a video camera, or an electromagnetic beam source mounted on the reference railroad truck that is directed to a target mounted on a second, loaded railroad truck spaced from the reference railroad truck. Alternatively, a mechanical walking beam can be used to create the reference plane. A measurement indicative of the distance between the reference plane and the railroad track is taken when the reference truck is over a point in the track and a second measurement indicative of the distance between the reference plane and the track is taken when the loaded railroad truck is over the same point in the track. These measurements can be taken using a first reference truck and a first target bearing truck on a reference railroad car or a reference loaded portion of a long railroad car and a second reference truck and a second target bearing truck on a second loaded railroad car or a load bearing portion of a long railroad car.

DESCRIPTION OF THE PREFERRED EMBODIMENTS

Dynamic railroad track measurements suffer in accuracy for lack of a stable reference plane from which a measurement may be taken. Attempts at employing the body of the vehicle as a reference plane for track measurements have proven unsatisfactory, as the vehicle body tends to bounce and sway as it encounters track irregularities and curves. Inertia based systems are capable of providing measurements but don't operate effectively at slow speeds. In accordance with the present invention, however, it has been found that a railroad platform, such as a truck, having metal track engaging wheels provides an excellent reference platform from which a line of sight reference plane can be created for dynamic track measurement applications. A conventional railroad truck having a plurality of flanged, spaced metallic railroad wheels in engagement with a railroad track accurately follows the track around curves, over topological variations, and from softer track support surfaces onto hard support surfaces such as bridges. Even more importantly, it has been found that spaced sequential railroad trucks follow the same path over the same point in a track even though the trucks in a sequence are subjected to different loads. Consequently a railroad truck having at least two pairs of spaced railroad wheels with each pair being joined by an axle provides an excellent measurement reference platform for taking dynamic measurements of track conditions along the track.

Figure 1:
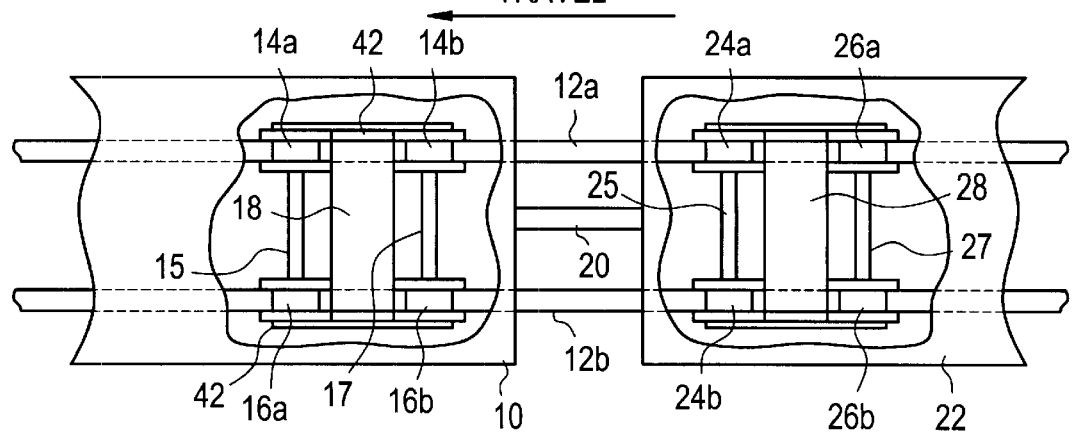
FIG. 1 is a partially cutaway plan view showing spaced railroad trucks used for the present invention.

The method of the present invention may be performed, as illustrated in FIG. 1, by a moving railway vehicle 10 mounted on spaced rails 12a and 12b by the metal, flanged railway wheels 14a and 14b and 16a and 16b of reference railway truck 18 attached in a conventional manner to the railway vehicle 10. The wheels 14a and 14b share a common axle 15 while the wheels 16a and 16b share a common axle 17.

Coupled to the railway vehicle 10 by a coupling 20 is a second railway vehicle 22 which is a loaded railway vehicle mounted on the rails 12a and 12b by the metal, flanged railway wheels 24a and 24b and 26a and 26b of a loaded railway truck 28 attached in a conventional manner to the railway vehicle 22. The wheels 24a and 24b share a common axle 25 and the wheels 26a and 26b share a common axle 27.

In subsequent figures of drawing, only one rail of the track and only one or two wheels of the reference and loaded trucks will be shown, it being understood that in all cases there are two track rails and at least four wheels in each truck or reference platform with at least two wheels for a truck or other reference platform in engagement with each rail. Also, as will be subsequently described, the reference truck or platform 18 and loaded truck 28 can be on different railway vehicles as shown in FIG. 1 or they can be on the same railway vehicle. Also the method and apparatus of the present invention operates effectively during movement in either direction along the track.

Figure 2:
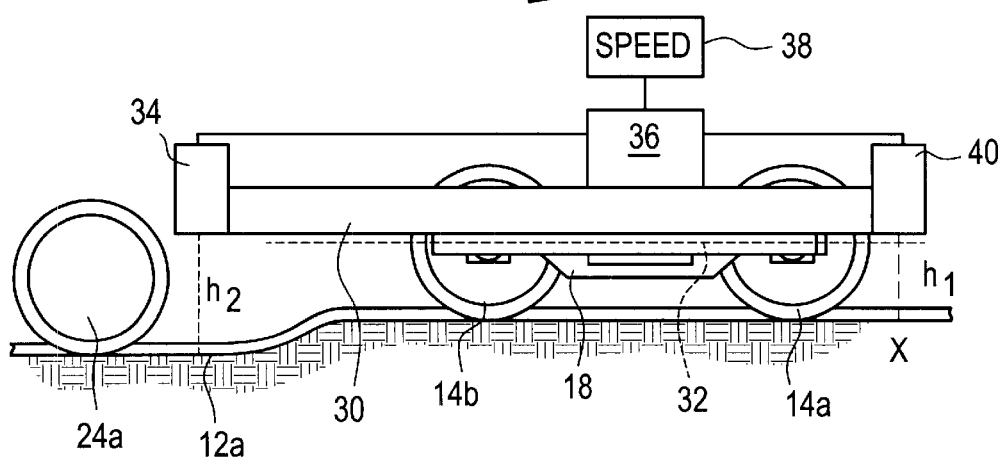
FIG. 2 is a diagrammatic view showing a walking beam reference for the dynamic track stiffness measurement system of the present invention.

Turning to FIG. 2, in its simplest form, the method of the present invention may be performed by a walking beam reference 30 secured to extend outwardly from the reference truck 18 to create a reference plane. Preferably the walking beam reference is parallel to a plane 32 extending through the centers of the wheels 14a and 14b and 16a and 16b. The walking beam reference carries measuring instruments 34 and 40 which repeatedly and simultaneously measure the distances h1 and h2 between the walking beam and the track in the area of the reference truck 28 indicated by the wheel 24a. The measuring instrument may be any one of a number of known electrical, optical or mechanical measuring instruments which will measure the distances h1 and h2 between the walking beam and the track and provide this distance measurement to a recording instrument 36.

Ideally, more than just distance measurements h1 and h2 between the walking beam and the track in the area of the truck 28 are taken. Multiple distance, rate of change of distance or tilt of truck measurements will improve repeatability. Also, the beam 30 may be elongated to carry additional measuring instruments.

The reference truck 18 provides some load L1 to the track while the truck 28 provides a much greater load L2 to the track. The loads L1 and L2 are known and may be stored in a control processor which constitutes the recording instrument 36. Also, the distance between the trucks 18 and 28 is known and stored in the processor 36. The processor receives speed or distance information from a speed or distance sensor 38, and with this data, the processor can calculate when the loaded truck 28 will pass over a point in the track which was previously traversed by the reference truck 18. When the reference truck traverses point x in the track, measuring instrument 40 measures the distance h1 between the walking beam and the track and provides this measurement to the processor 36. The processor controls both the measuring instrument 40 and the measuring instrument 34, and triggers the measuring instrument 40 to measure the distance h1 at point x. Now the processor calculates the time that it will take the loaded truck 28 to reach point x, and at that time the processor triggers the measuring instrument 34 to measure the distance h2 at point x. Now the processor can calculate and record track stiffness at point x in accordance with the following formula:

$$dh = h2 - h2$$

$$dL = L2 - L1$$

$$dh/dL = \text{stiffness}$$

As the reference truck 18 and the loaded truck 28 move along the track, the processor 36 will cause sequential track stiffness measurements to be made at spaced points along the track.

Figure 3:
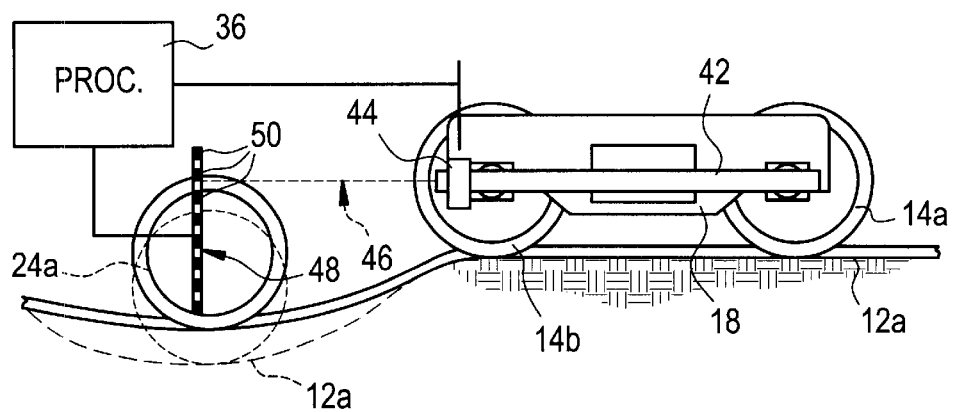
FIG. 3 is a diagrammatic view showing a second embodiment of the dynamic track stiffness measurement system of the present invention.

Ideally, as shown in FIG. 3, the walking beam 30 can be replaced by a reference plane generator 44 such as a laser or video camera mounted on the reference truck 18. The axles 15 and 17 at the center of the wheels 14a, 14b, 16a and 16b mount joinder bars 42, and a beam source, such as a laser, or a video camera is mounted on a joinder bar to create an optical reference plane 46 in line with the center of the wheels 14a and 14b. The optical reference plane bisects a target 48 mounted on the loaded truck 28. For example, the target can be mounted on the axle of the wheel 24a perpendicular to a plane passing through the center of the wheels 24a and b and 26a and b.

When the reference plane generator 44 is a light beam source, such as a laser, the target 48 includes a plurality of vertically arranged photosensitive cells 50 which, when contacted by the beam forming the reference plane 46, provide a position signal to the processor 36. As the target moves vertically with the loaded truck 28, a different cell 50 is contacted by the beam reference plane 46 to provide a signal indicative of the distance between the track and the reference plane.

If the reference plane generator 44 is a video camera, the target 48 can contain vertically spaced indicia in the position of the light sensitive cells 50, and the camera will focus on one of these indicia indicative of the distance between the reference plane 46 and the track. The image from the video camera will then signal this distance to the processor 36.

Other beam sources, such as a source of electromagnetic energy, can be used as the reference plane generator 44. A radio beam source can be used as the reference plane generator in combination with a target which reflects the radio beam back to a receiver in the beam generator which then provides a signal indicative of the distance between the reference plane and the track to the processor. Alternatively, the radio beam could activate receiver cells in the target to provide the distance signal to the processor.

Figure 4:
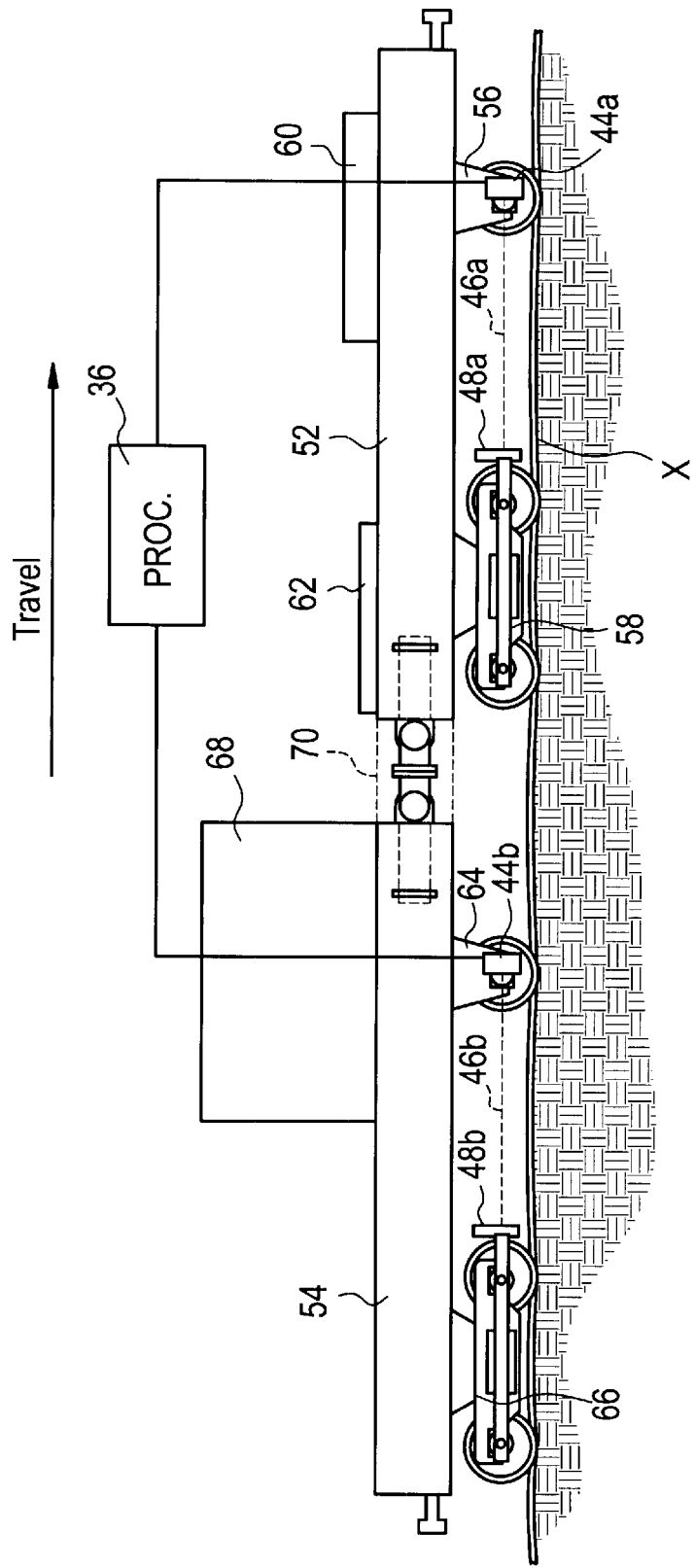
FIG. 4 is a diagrammatic view in side elevation of two railroad cars bearing the dynamic track stiffness measurement system of the present invention.

Referring to FIG. 4, a reference car 52 may be coupled to a loaded car 54 to accomplish the dynamic track measurement method of the present invention. The reference car has a truck 56 which mounts a reference plane generator 44a to create a first reference plane 46a and a truck 58 which bears a target 48a. The reference car bears a light load 60 to load the truck 56 and a second light balancing load 62 to load the truck 58. The loads 60 and 62 form the load L1. When the reference car is over point X in the track, the processor 36 causes distance measurement h1 to be taken using the reference plane generator 44a and the target 48a.

The loaded car 54 has a truck 64 which mounts a second reference plane generator 44b to create a second reference plane 46b and a truck 66 which bears a target 48b. The loaded car bears a heavy load 68 which forms the load L2. When the loaded car 54 reaches point X, the processor 36 causes distance measurement h2 to be taken by the reference plane generator 44b and the target 48b. The processor then uses this data to compute a track condition, such as track stiffness, in the manner previously described.

The trucks 44a and *b* and 46a and *b* with the loads 60, 62, and 68 could be mounted on a single large car as indicated by the broken lines 70. This would require the use of a long car to space the trucks 64 and 66 a substantial distance, i.e. 25 feet or more, from the trucks 56 and 58.

Figure 5:
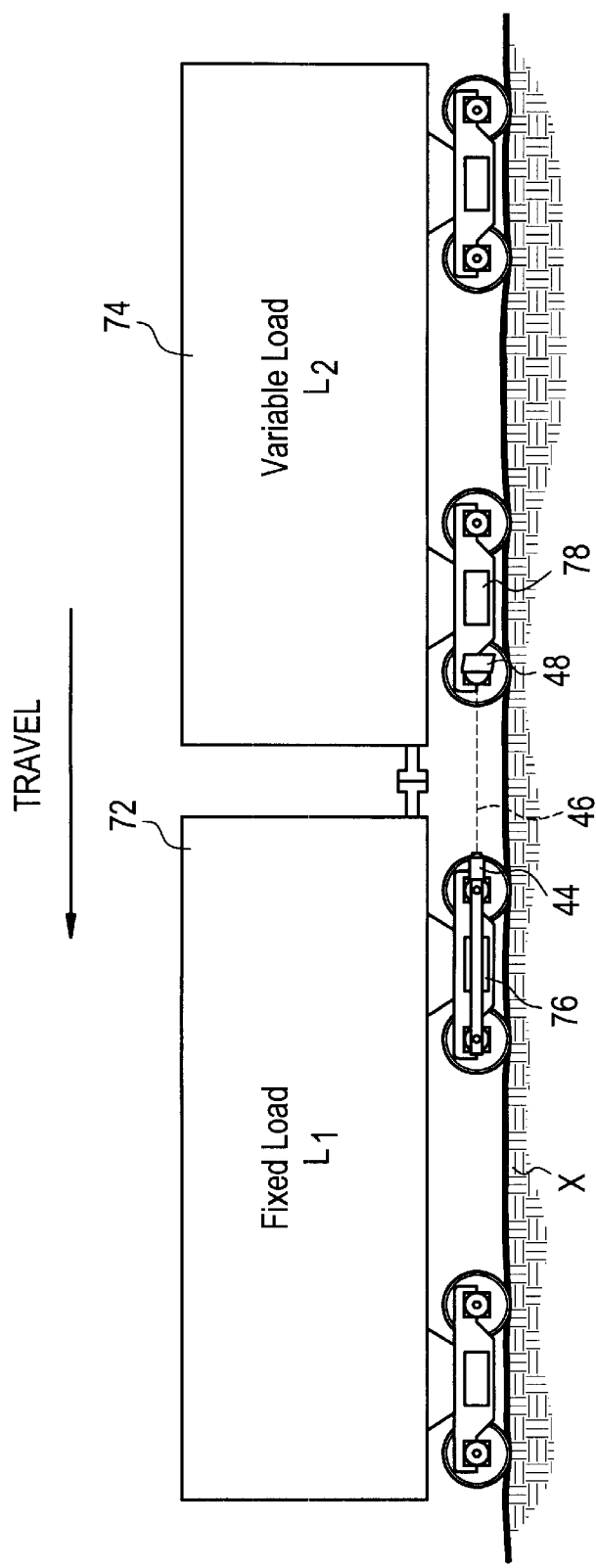
FIG. 5 is a diagrammatic view in side elevation of two railroad cars bearing a third embodiment of the dynamic track stiffness measurement system of the present invention.

In FIG. 5, a fixed load is carried by a reference car 72 and a greater load is carried by a loaded car 74. A reference truck 76 on the reference car carries a reference plane generator 44 while a loaded truck 78 carries a target 48. As previously described, the height measurement between the track and the reference plane 46 can be taken periodically as the truck 78 passes along the track.

We claim:

1. A method for dynamically measuring a condition of a railroad track having two parallel spaced rails using at least first and second railroad car supporting railroad trucks each having at least two spaced pairs of wheels engaging each of said parallel spaced rails with one wheel of each pair engaging one of said spaced rails which includes:

providing a first railroad car supporting truck on said railroad track to be measured as a first reference railroad truck, providing a second railroad car supporting truck as a first sensing railroad truck on said railroad track to be measured in spaced relation to said first railroad car supporting truck, creating a first line of sight reference plane above and parallel to at least one of said spaced rails which extends from said first reference railroad truck outwardly toward said first sensing railroad truck, moving said first and second railroad car supporting trucks together at the same speed along the railroad track to be measured, and measuring during a measurement cycle the position of the railroad track under said second railroad car supporting truck relative to said first line of sight reference as said first and second railroad car supporting trucks move along said railroad track.

2. The method of claim 1 which includes taking a reference measurement during said measurement cycle of the position of the railroad track under said first railroad car supporting truck at a measurement location relative to said first line of sight reference and measuring at the same measurement location as a second sensed measurement the position of the railroad track under said second railroad car supporting truck relative to said first line of sight reference.

3. The method of claim 2 which includes measuring the speed at which said first and second railroad car supporting trucks move along said railroad track and timing the period between the reference and second sensed measurements in relation to said measured speed to cause said reference and second sensed measurements to occur at the same measurement location.

4. The method of claim 3 which includes subtracting said reference measurement from said second sensed measurement to obtain a track position difference value.

5. The method of claim 3 which includes applying a reference load to the first reference railroad truck, applying a second load greater than said reference load to said first sensing railroad truck, subtracting the weight of said reference load from the weight of said second load to obtain a load difference value, and dividing said position difference value by said load difference value to obtain a track stiffness value.

6. The method of claim 3 which includes creating said first line of sight reference plane with a structural beam mounted on said first reference railroad truck and projecting outwardly therefrom toward said first sensing railroad truck in spaced relation above said railroad track.

7. The method of claim 6 which includes taking said reference and second sensed measurements from opposite ends of said structural beam.

8. The method of claim 1 which includes creating said first line of sight reference plane to extend in line with a line passing through the centers of the one wheel of each of the two spaced pair of wheels which engage one of said spaced rails.

9. The method of claim 1 which includes mounting a second railroad car supporting truck as a second reference railroad truck having a plurality of railroad track engaging wheels on said railroad track in spaced relation to said first reference railroad truck and said first sensing railroad truck, creating a second line of sight reference plane in spaced relation to said railroad track from said second reference railroad truck, mounting a second railroad car supporting truck as a second sensing railroad truck having a plurality of railroad track engaging wheels on said railroad track along said second line of sight reference plane and in spaced relation to said second reference railroad truck, and directing said second line of sight reference plane to said second sensing railroad truck, and measuring the railroad track induced position of said second sensing railroad truck relative to said second line of sight reference plane as an indicator of railroad track position under said second sensing railroad truck while moving said second reference railroad truck and said second sensing railroad truck along said track with said first reference railroad truck and first sensing railroad truck.

10. The method of claim 9 which includes creating said second line of sight reference plane in line with said first line of sight reference plane.

11. The method of claim 10 which includes creating said first line of sight reference plane to extend in line with a line passing through the centers of the one wheel of each of the two spaced pair of wheels which engage one of said spaced rails.

12. A device for dynamically measuring a condition of a railroad track having two parallel spaced rails comprising:
a first railroad car supporting truck having a plurality of metal, railroad track engaging wheels with wheels engaging each of said spaced rails,
a second railroad car supporting truck having a plurality of metal, railroad track engaging wheels with wheels engaging each of said spaced rails, said second railroad car supporting truck being connected in spaced relationship to said first railroad car supporting truck for movement therewith along said railroad track,
a reference plane generating unit mounted on said first railroad car supporting truck, said reference plane generating unit operating to define a line of sight reference plane above and parallel to at least one of said spaced rails which extends outwardly from said first railroad car supporting truck toward said second railroad car supporting truck,
a first railroad truck position sensor mounted on said second railroad car supporting truck to provide a track measurement of the distance between the railroad track beneath said second railroad car supporting truck and said line of sight reference plane, and
a processor unit connected to receive the track measurement.

13. The device of claim 12 wherein a second railroad track position sensor is mounted on said first railroad car supporting truck to provide a reference track measurement of the distance between the railroad track beneath said first railroad car supporting truck and said line of sight reference plane to said processor or unit.

14. The device of claim 13 wherein said processor unit is connected to control the operation of said first and second railroad track position sensors and a speed sensor unit is connected to said processor unit to sense and provide to said processor unit the speed of said first and second railroad car supporting trucks, said processor unit causing said first and second railroad track position sensors to operate to measure the distance between the railroad track and the line of sight reference plane at the same position on the railroad track.

15. The device of claim 12 wherein each railroad car supporting truck includes at least two pairs of wheels with one wheel in each pair of wheels contacting one of said spaced rails, said reference plane generating unit being mounted on said first railroad car supporting truck to define said line of reference plane to extend in line with a line passing through the centers of at least one wheel of each of the two spaced pair of wheels of said first railroad car supporting truck which engage one of said spaced rails.

16. The device of claim 15 wherein said first railroad truck position sensor is formed and mounted on said second railroad car supporting truck to extend substantially perpendicular to a line passing through the centers of at least one wheel of each of the two spaced pair of wheels of said second railroad car supporting truck which engage one of said spaced rails.

17. The method of claim 3 which includes creating said first line of sight reference plane by a light beam source mounted on said first reference railroad truck.

18. The method of claim 3 which includes mounting a camera on said first reference railroad truck to create said first line of sight reference plane.

19. The method of claim 3 which includes creating said first line of sight reference plane by a beam of electromagnetic energy transmitted outwardly from said first reference railroad truck by a source of electromagnetic energy mounted on said first reference railroad truck.

20. The method of claim 9 which includes applying a first load to said second sensing railroad truck in a vertical plane relative to said railroad track.

21. The method of claim 20 which includes measuring the railroad track induced position of said first sensing railroad truck relative to said first line of sight reference plane to obtain a first measurement h1 and measuring the railroad track induced position of said second sensing railroad truck relative to said second line of sight reference plane to obtain a second measurement h2 and subtracting h1 from h2 to obtain a track position difference value.

22. The method of claim 21 which includes measuring the speed at which said first and second reference railroad trucks and said first and second sensing railroad trucks move along said railroad track and timing the second measurement h2 in relation to such speed to occur at the position on the railroad track where the first measurement h1 was taken.

23. The method of claim 22 which includes applying a reference load to said first sensing railroad truck in a vertical plane relative to said railroad track, said reference load being of less weight L1 than the weight L2 of a load applied to said second sensing railroad truck, subtracting L1 from L2 to obtain a load difference value and dividing the track position difference value by the load difference value to obtain a track stiffness value.

24. The method of claim 21 which includes obtaining the first measurement h1 at a measurement position on the railroad track and subsequently timing the second measurement h2 to occur at the same measurement position on the railroad track where the first measurement h1 occurred.

25. The method of claim 21 which includes taking a plurality of spaced, successive measurements h1 and h2 as the first and second reference railroad trucks and first and second sensing railroad trucks move along said track.

26. The method of claim 25 which includes measuring the speed at which said first and second reference railroad trucks and said first and second sensing railroad trucks move along said railroad track and timing the second measurement h2 relative to the first measurement h1 in relation to such speed.

27. The method of claim 26 which includes applying a reference load to said first sensing railroad truck in a vertical plane relative to said railroad track, said reference load being of less weight L1 than the weight L2 of the load applied to said second sensing railroad truck, subtracting L1 from L2 to obtain a load difference value and dividing the track position difference value by the load difference value to obtain a track stiffness valve.

28. The method of claim 27 which includes obtaining the first measurement h1 at a measurement position on the railroad track and subsequently timing the second measurement h2 to occur at the same measurement position on the railroad track where the first measurement h1 occurred.

29. The device of claim 12 wherein said railroad track position sensor includes a light sensitive grid operative to provide an electrical output signal indicative of the position on said light sensitive grid of a light beam projected onto said light sensitive grid, said reference plane generating unit including a light source for projecting a beam of light along said line of sight reference plane onto said light sensitive grid.

30. The device of claim 29 wherein said light source includes a laser.

31. The device of claim 12 wherein said railroad track position sensor includes a target bearing spaced indicia, said line of sight reference plane generating unit including a camera focused along said line of sight on indicia carried by said target.

32. The device of claim 12 wherein a vertical load relative to said railroad track is applied to said second railroad truck to cause said second railroad truck to load said railroad track in the vertical plane, said second railroad truck being loaded to apply a greater load to the railroad track in the vertical plane than a reference load applied to the railroad track in the vertical plane by said first railroad truck.

33. The device of claim 32 wherein said first railroad car supporting truck is mounted on a first railroad track mounted vehicle and said second railroad car supporting truck is mounted on a second railroad track mounted vehicle.

34. The device of claim 32 wherein said first and second railroad car supporting trucks are mounted upon the same railroad track mounted vehicle.

* * * * *